United States Patent

[11] 3,595,519

[72] Inventor Angelo Girola
 Busto Arsizio, Varese, Italy
[21] Appl. No. 815,362
[22] Filed Apr. 11, 1969
[45] Patented July 27, 1971
[73] Assignee Duplomatic Meccanica Applicazioni
 Oleodinamiche, S.p.A.
[32] Priority Apr. 12, 1968
[33] Italy
[31] 15,228 A/68

[54] HYDRAULIC TRACER MECHANISM ADAPTED FOR USE WITH MACHINE TOOLS IN GENERAL
 5 Claims, 2 Drawing Figs.
[52] U.S. Cl.................................................. 251/3,
 90/62
[51] Int. Cl..................................................B23q 35/16

[50] Field of Search........................................... 251/3;
 90/62; 60/97 T; 91/37

[56] References Cited
 UNITED STATES PATENTS
2,935,289 5/1960 Chiappulini................. 251/3
3,081,060 3/1963 Thomas....................... 251/3
3,084,899 4/1963 Dever et al.................. 251/3
3,390,859 7/1968 Rosebrook................... 251/3

Primary Examiner—Henry T. Klinksiek
Assistant Examiner—Richard Gerard
Attorney—Stowell and Stowell ABSTRACT: A hydraulic tracer mechanism for milling cutters, wherein two control units, driven by the stylus or tracer point, are so arranged that the longitudinal axes of said units are parallel to each other and parallel to the stylus or tracer point axis.

HYDRAULIC TRACER MECHANISM ADAPTED FOR USE WITH MACHINE TOOLS IN GENERAL

This invention relates to a hydraulic tracer mechanism applicable to machine tools in general such as, for instance, lathes, milling cutters and the like, to control the relative motions—in two different directions and perpendicularly to each other—of the workpiece with respect to the tool.

The main object of the invention is to provide a tracer mechanism with limited overall dimensions, with a simple and reliable performance, enabling the exact reproduction of the profile of the template or pattern, even if the latter shows undercuts or counterslopes, whichever their mutual arrangement may be.

It is a further object of this invention to provide a tracer mechanism which can be easily and correctly installed on machine tools, permitting control and adjustment, in a simple and practical manner, the mutual position of the ports shown by one or by more of the cylinders of the control apparatus or control units, with respect to the grooves of the corresponding control piston.

The tracer mechanism of the present invention is of a type wherein the stylus or tracer point transmits its motion to two control units designed to control, by means of corresponding hydraulic motors, the members designed to move the workpiece, in two different directions and perpendicularly to each other, with respect to the tool.

The tracer mechanism of the present invention is characterized in that the axes of the two control units are parallel and in that the movable equipments of said control units are operatively connected to the stylus by means of two units formed by transmission members sensing, or responding to, the axial and transverse movements of the stylus cooperating with the template or pattern. According to the invention the axis of one of the two control units is coincident with the stylus axis. In an advantageous embodiment of the tracer mechanism, the stylus or tracer point is provided with a ball-like head, coupled slidably and in axial direction, to the seat comprised by the tracer body and cooperating, through spring centering members, with a spring biased slider, the periphery of which is provided with a groove having sloping walls, One of the ends of at least one rocker arm fulcrumed to the control apparatus body cooperates with the above mentioned sloping walls, whereas the other end of said rocker arm is operatively connected to the movable equipment of one of the two control units; and whereas the movable equipment of the first of said units is directly operated by said slider.

The invention will be now explained in the following specification, with reference to the accompanying drawings, showing, by way of example, an advantageous embodiment of a tracer mechanism for milling cotters for two dimension tracing.

Figure 1:
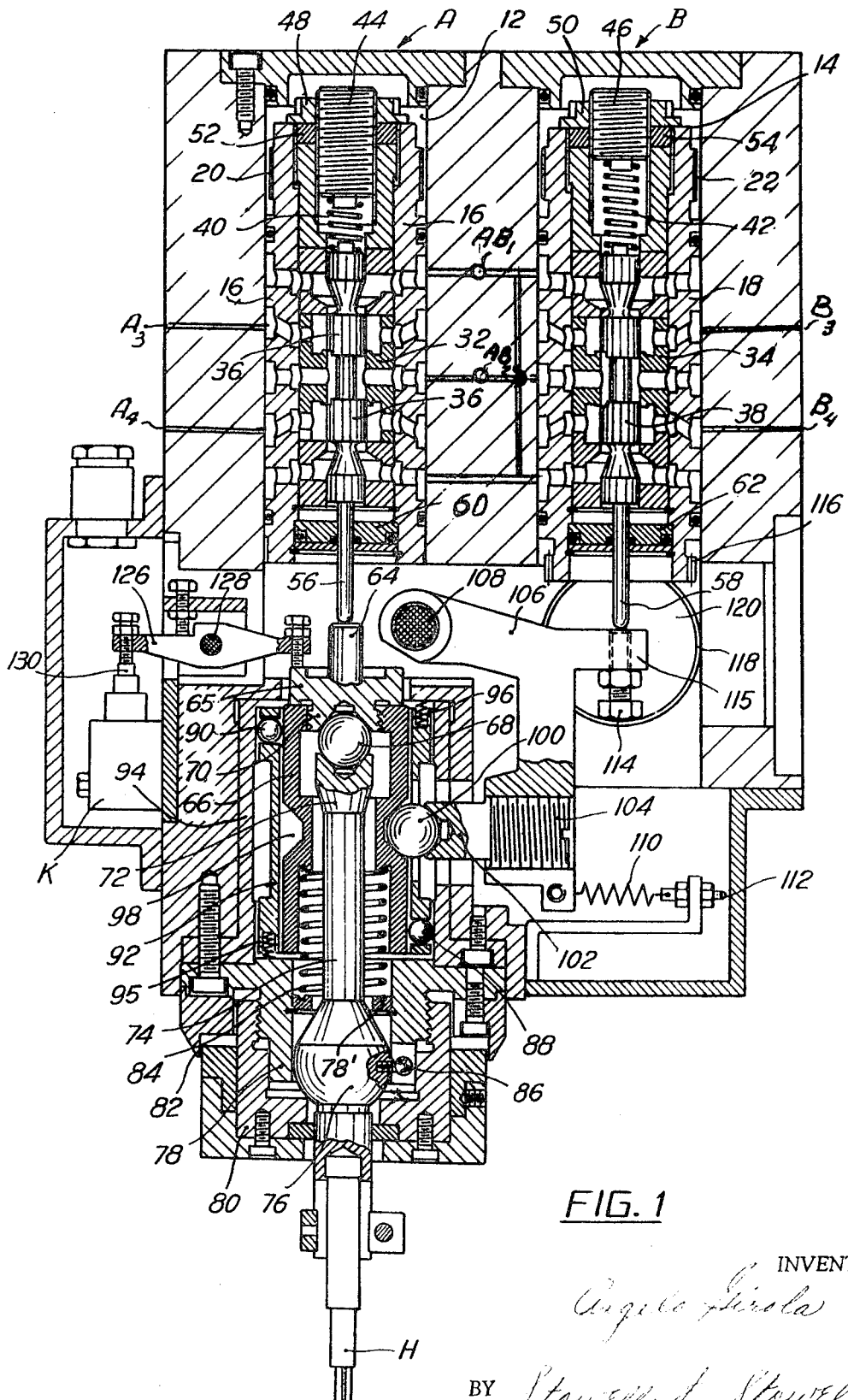
FIG. 1 is an axial cross section extending lengthwise to the two control units of the tracer.
Figure 2:
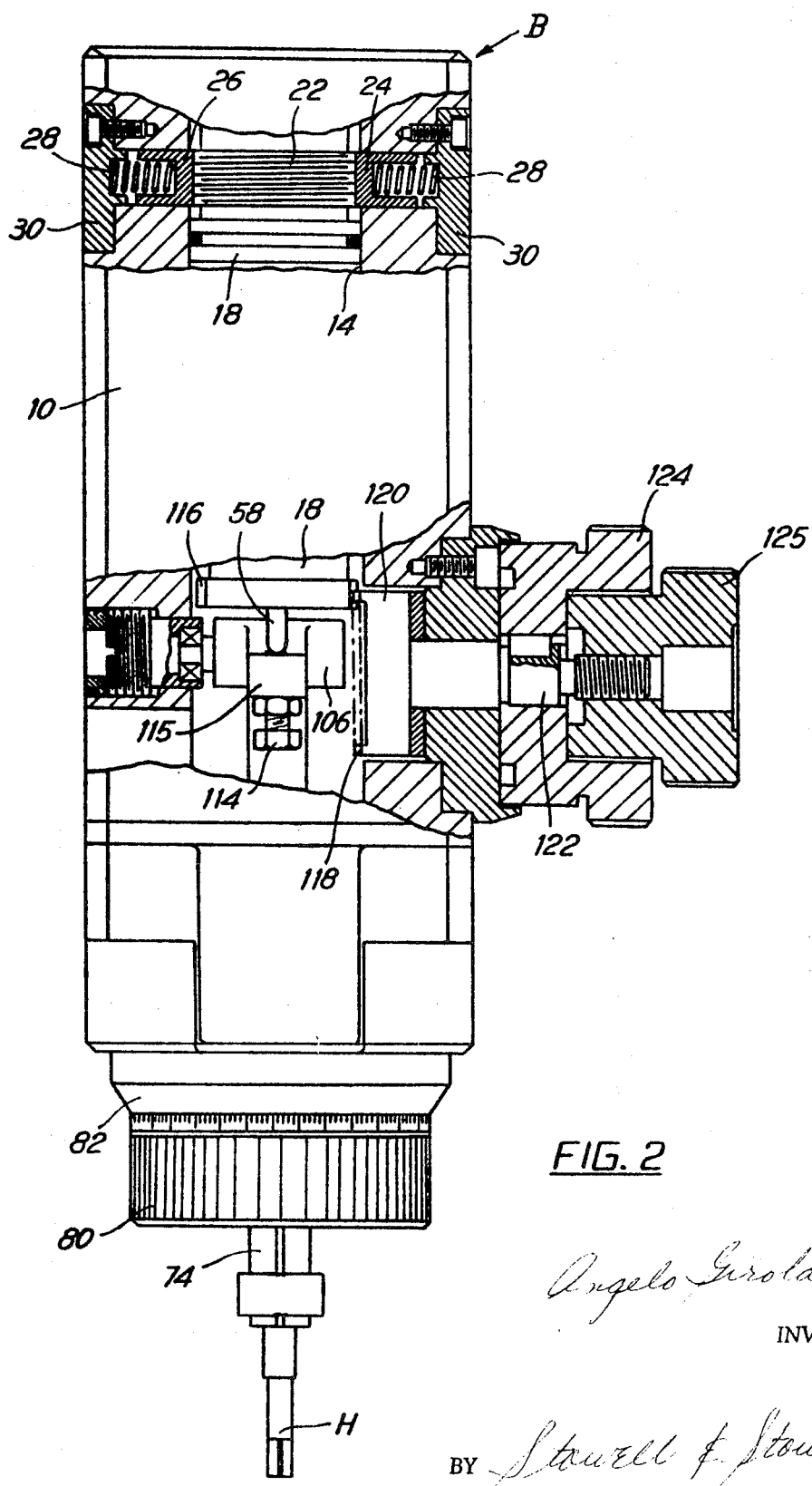
FIG. 2 is a view in lateral cross section.

With reference of the above-mentioned Figures, the tracer illustrated therein consists of a prismatic body 10, comprising two cylindrical chambers 12 and 14, to connect the two control units A and B, the axes of said control units being parallel and vertical. Said two units A and B are provided with jackets 16 and 18, the outer surfaces of which are provided with peripheral grooves, to connect the radial bores of said jackets to conduits within body 10, said grooves being connected, through conduits and tubes, to a pressure generator ($AB_1$), to an outlet ($AB_2$) and to hydraulic motors ($A_3$, $A_4$ and $B_3$, $B_4$) of any conventional type, to move a workpiece with respect to the tool. Jackets 16 and 18 can be fitted, according to well-known practice, axially into the corresponding chambers 12 and 14, by means of threads 20 and 22, provided towards the end of said jackets, to cooperate with nut screws consisting of pairs of pins 24 and 26 with threaded ends (FIG. 2); the component parts of said pairs are retained in bores of body 10, according to the diameters shown by chambers 12 and 14.

At least one of the component parts of each of the nut screws is influenced by spring means 28 retained by a lid 30 advantageously fixed to body 10, in order to lock control units A and B.

Cylinders 32 and 34 are positioned with jackets 16 and 18. Said cylinders are provided internally, according to well-known practice, with peripheral grooves connected, by ports and conduits in body 10, both to the outlet $AB_2$ and to the above-mentioned hydraulic motors. The above-mentioned connections are controlled by the grooves of small spool pistons 36 and 38, each of which is biased by spring means 40 and 42. The latter are retained by adjusting or setting screws 44 and 46 screwed to the upper ends of cylinders 32 and 34, where said means can be locked by locknuts 48 and 50 in such a way that each cylinder forms, with its corresponding jacket, one single unit.

The lower part of pistons 36 and 38 each terminate in ends or rods 56 and 58 projecting from the respective jacket-and-cylinder units, through guide members 60 and 62, suitably fixed to the lower ends of jackets 16 and 18.

Rod or stem 56 cooperates with the end of pivot rod 64, the latter being integral with head 65 fixed to the upper end of a slider 66, the latter being coaxial with spool piston 36.

One ball-like member 68 is housed in two recessed seats 70 and 72 the first of which is fixed, with its lower part, to head 65, whereas the second is formed in the upper end of rod 74 the lower end of which is fixed to one ball-head 76 housed, with a very slight play, in the bore of collar 78 fixed to body 10. Ball-head 76 is integral with the stylus or tracer point H and is coaxial with rod 74. The lengths of the above described parts are such, that head 76 is substantially midway between the upper end of rod 74 and stylus or tracer point H. Head 76 is maintained in axial position inside collar 78 by means of the edge of a threaded locking ring 80 screwed into said collar 78 in such a way that, as said locking ring is screwed more or less deeply into the above-mentioned collar, the axial position of both, the ball-head 76 and the slider 66 is thereby adjusted, as will be explained in the following. To adjust the movement to be imparted to head 76, locking ring 80 is provided with a graded scale, cooperating with an index 82 fixed to body 10. A spring 84, inserted around rod 74, acts on slider 66, to push it upwardly. The lower end of said spring is retained by collar 78′.

A correct cooperation between ball-head 76 and collar 78 is maintained by a ball-pin 86 integral with said head 76, said pin engaging slidably into a radial slit provided in the edge of said collar 78, to retain and to guide ball-head 76; and also to guide rod 74, when ball-head 76 performs a swinging motion.

Slider 66 is retained and guided by means of two ball-like units 88 and 90, seated in openings extending radially toward the outer end of a tubular member 92 coaxial with the above-mentioned slider 66. Tubular member 92 is retained at equal distance from the ends of the bushing of a guide 94 locked to body 10, by means of the contrasting action of two opposed springs 95 and 96 housed in axial seats provided at the ends of said tubular member.

The ball-like members 88 and 90 cooperate with the integral wall of guide bushing 94, as well as with the external surface of slider 66.

A peripheral groove 98 is provided substantially at the middle part of slider 66, the sidewalls of said groove being inclined, to converge toward the axis of said slider, in such a way as to form an axial cam.

A ball-like member 100 engages groove 98, said member being retained in a seat 102, recessed in the end of a threaded pivot 104 screwed into one of the ends of a rocker arm 106, the fulcrum 108 of which is mounted in tracer body 10.

A spring 110 acts on rocker arm 106, said spring being adjustably retained by a threaded rod 112, to engage adjusting screw 114, provided at the other end 115 of said rocker arm, with rod 58 of control piston 38.

For easy adjustment of the position of stylus or tracer point H in relation to the reference surface of the pattern or template, the unit formed by jacket 18 and cylinder 34 can be manually moved lengthwise to its own axis, to modify the relative position of the peripheral grooves of said cylinder 34 with respect to the grooves of control piston 38. For this purpose the lower end of jacket 18 (see also FIG. 2) is provided with a helically toothed collar 116 that cooperates with complementary teeth 118. The last-mentioned teeth are shown by the front side or face of head 120 integral with pivot 122, the end of which is provided with a knurled driving-and-locking nut 124 having a locking button 125.

The top of head 65, integral with slider 66, is provided with a collar. One of the ends of a rocker-arm 126 fulcrumed, by means of a pivot 128, to body 10 and cooperates, through an adjusting screw, with the above-mentioned collar.

The other end of said rocker arm is connected to the movable equipment 1300 of an electric switch K, preferably to a microswitch, to control, through relays or circuit-breakers, such parts of the machine to which the tracer mechanism is mounted, for instance the performance of one of the milling cutter tables, to obtain cuts of constant thickness.

The performance of the tracer mechanism of this invention can now be easily understood. When starting the work, the position of stylus or tracer point H is so adjusted as to exert the desired action and blocks 78 and 124, to cause units 16—32 and 18—34 to move in axial direction with respect to pistons 36 and 38.

Due to the relative motion between the pattern (not shown) and the stylus or tracer point H, the latter is moved in axial and angular directions thus causing, in turn, the axial motion of slider 66.

The axial sliding motion of slider 66 causes control piston 36 to move, with a certain ratio, and directly control piston 36 and, indirectly (through groove 98, the ball-shaped member 100 and rocker-arm 106) the control piston 38, to modify the driving conditions of the motors which move the milling cutter tables.

It is understood that the above-described tracer mechanism is capable of controlling the stroke of both of the motors connected to the members designed to move any one of the three working tables of the milling cutter, for instance either the two horizontal tables, or one of the horizontal and the vertical table.

In consideration of the foregoing, the above-described tracer mechanism fills any one of the desired working requirements. Furthermore, this tracer mechanism requires a limited space and is easy to mount and to operate.

Last but not least, the tracer mechanism of this invention is easy to fabricate with particular reference to chambers 12 and 14, since said chambers are parallel to each other, with identical diameters, thus facilitating interchangeable units.

The tubular member 66 can be used to drive the small pistons 36, 38 of the two control units A and B directly. Or else, the profile of groove 98 can be such as to move the two small pistons 36 and 38 according to the desired ratio. This can be done by advantageously modifying the lever system, that connects groove 72 to the small piston 38.

It is also possible to provide the tracer mechanism with three control units, two of which are driven by cam 98 of slider 66, with a 90° inclination to each other.

I claim:

1. A hydraulic tracer mechanism including: a frame having a body housing two spool valve control units, each said unit having a plurality of fluid ports therein and arranged with their longitudinal axes parallel, a tracer point located at the bottom of a tracer rod, said tracer rod being coaxial with the first of said spool valve control units and mounted for axial translational motion, a fulcrum on said tracer rod for permitting angular motion of said rod with respect to said frame, a sleeve positioned around an upper part of said tracer rod and mounted for executing axial translational motion responsive to angular and translational motion of said tracer rod, a cam and cam follower on said sleeve to convert motion parallel to said tracer rod to motion perpendicular to said tracer rod, lever means to transmit motion from said cam follower to the spool of the second spool valve control units, a pivot rod whose upper ends bears against the spool in the first spool valve control unit, said pivot rod being coupled to said sleeve for movement therewith, means for converting angular motion of said tracer rod to axial translational motion of said sleeve, said converting means comprising a ball member, said ball member positioned between a seat on said pivot rod and a seat on the upper end of said tracer rod, whereby both spool valve control units are actuated by any motion of the stylus.

2. The hydraulic tracer mechanism of claim 1 wherein said cam is defined by a peripheral groove around said sleeve, the said cam follower is defined by a ball member partially located within the groove, and a bellcrank having one leg bearing against said cam follower ball and the other by bearing against the spool of the second spool valve control unit.

3. The hydraulic tracer mechanism of claim 1 wherein said fulcrum is defined by a ball integral with said tracer rod, a pin extending radially outwardly of said ball and positioned in a slot, said slot being vertical to thereby permit translational motion of said ball parallel to the axis of the tracer rod.

4. The hydraulic tracer mechanism of claim 1 including a collar secured to said frame, said collar being coaxial with said sleeve and positioned below it, said collar surrounding the fulcrum of said tracer rod, said fulcrum being located midway of said tracer rod.

5. The hydraulic tracer mechanism of claim 1 including a slider sleeve positioned around said sleeve, said slider sleeve carrying antifriction means engaging both said sleeve and said frame, said slider sleeve having an opening on a wall portion thereof to accommodate said cam and cam follower.